United States Patent
Wang et al.

(10) Patent No.: US 7,529,536 B2
(45) Date of Patent: May 5, 2009

(54) RF-CONTROLLED POWER SAVING COMMUNICATION SYSTEM

(75) Inventors: Han-Che Wang, Guangdong (CN);
Shin-Hong Chung, Guangdong (CN);
Kuan-Hong Hsieh, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 358 days.

(21) Appl. No.: 11/309,454

(22) Filed: Aug. 10, 2006

(65) Prior Publication Data

US 2007/0120646 A1    May 31, 2007

(30) Foreign Application Priority Data

Aug. 12, 2005   (CN)   .................. 2005 1 0036588

(51) Int. Cl.
*H04B 1/16* (2006.01)
*H04M 1/00* (2006.01)
(52) U.S. Cl. .............. 455/343.1; 455/572; 455/574
(58) Field of Classification Search .......... 455/550.1, 455/574, 343.1, 343.2, 343.5, 572
See application file for complete search history.

(56) References Cited

U.S. PATENT DOCUMENTS

| | | | |
|---|---|---|---|
| 4,903,319 A | 2/1990 | Kasai et al. | |
| 5,627,882 A | 5/1997 | Chien et al. | |
| 5,717,319 A | 2/1998 | Jokinen | |
| 6,223,047 B1 | 4/2001 | Ericsson | |
| 6,606,490 B1 * | 8/2003 | Rainish et al. | 455/343.1 |
| 6,782,250 B2 * | 8/2004 | Rainish et al. | 455/343.2 |
| 7,072,697 B2 * | 7/2006 | Lappetelainen et al. | 455/574 |
| 7,089,434 B2 * | 8/2006 | Kuo | 713/300 |
| 7,095,991 B2 * | 8/2006 | Tsuchi et al. | 455/159.1 |
| 2002/0016188 A1 | 2/2002 | Kashiwamura | |
| 2002/0065117 A1 | 5/2002 | Suda | |
| 2003/0022704 A1 | 1/2003 | Lin | |
| 2003/0194986 A1 * | 10/2003 | Rainish et al. | 455/343.1 |
| 2003/0236077 A1 * | 12/2003 | Sivard | 455/127.1 |
| 2004/0127165 A1 * | 7/2004 | Chang et al. | 455/69 |
| 2005/0047795 A1 * | 3/2005 | Windover et al. | 398/164 |
| 2005/0114714 A1 * | 5/2005 | Albulet | 713/300 |

* cited by examiner

*Primary Examiner*—Sonny Trinh
(74) *Attorney, Agent, or Firm*—Winston Hsu

(57) ABSTRACT

An RF-controlled power saving communication system includes an electronic device (30), an antenna (60), a radio frequency (RF) receiver (40) and a power saving apparatus (20) for controlling power supply of the electronic device. The RF receiver receives RF signals via the antenna and transmits the RF signals to the electronic device to process. The RF receiver further transmits the RF signals to the power saving apparatus. The power saving apparatus resumes the power supply of the electronic device in accordance with the RF signals.

6 Claims, 3 Drawing Sheets

RF-CONTROLLED POWER SAVING COMMUNICATION SYSTEM

TECHNICAL FIELD

The present invention relates to power saving communication systems, and particularly to an RF-controlled (radio frequency controlled) power saving communication system.

RELATED ART

The research and development of cellular phones can be generally classified into two main fields. One is how to incorporate more features into a cellular phone (i.e., multifunctional cellular phone), and the other is how to develop better power saving functions so as to increase service time per a fully charged battery.

Currently, the power saving function is typical carried out during waiting operation periods of the cellular phones. Power supply to most parts of the cellular phones is cut off during waiting operation periods and therefore the cellular phones enters into a so-called "sleep state". However, even though the cellular phones are in the "sleep state", a small amount of power supply is still maintained to the cellular phones. Such power supply is applied to certain parts of the electronic device, especially to big power consumption devices: CPUs of the cellular phones, in order to rapidly "awaken" the cellular when reusing the cellular phones. Therefore, serious power consumption actually continues even when the cellular phones are in the "sleep state".

Powering off the cellular phones while not in use is the most effective way of saving power for the cellular phones. However, powering off the cellular phones will disable users to communicate with others.

Therefore, there is a need for providing a RF-controlled power saving communication system which can facilitate users to communicate with others while efficiently saving much more power.

SUMMARY

An RF-controlled power saving communication system (hereinafter "the system") is provided in accordance with a preferred embodiment. The system includes an electronic device, an antenna and a radio frequency (RF) receiver. The RF receiver is for receiving RF signals via the antenna and transmits the RF signals to the electronic device to process. The system further includes a power saving apparatus for controlling power supply of the electronic device. The power saving apparatus receives the RF signals from the RF receiver and resumes the power supply of the electronic device in accordance with the RF signals.

Other advantages and novel features will be drawn from the following detailed description with reference to the attached drawings, in which:

DETAILED DESCRIPTION OF THE EMBODIMENTS

Figure 1:
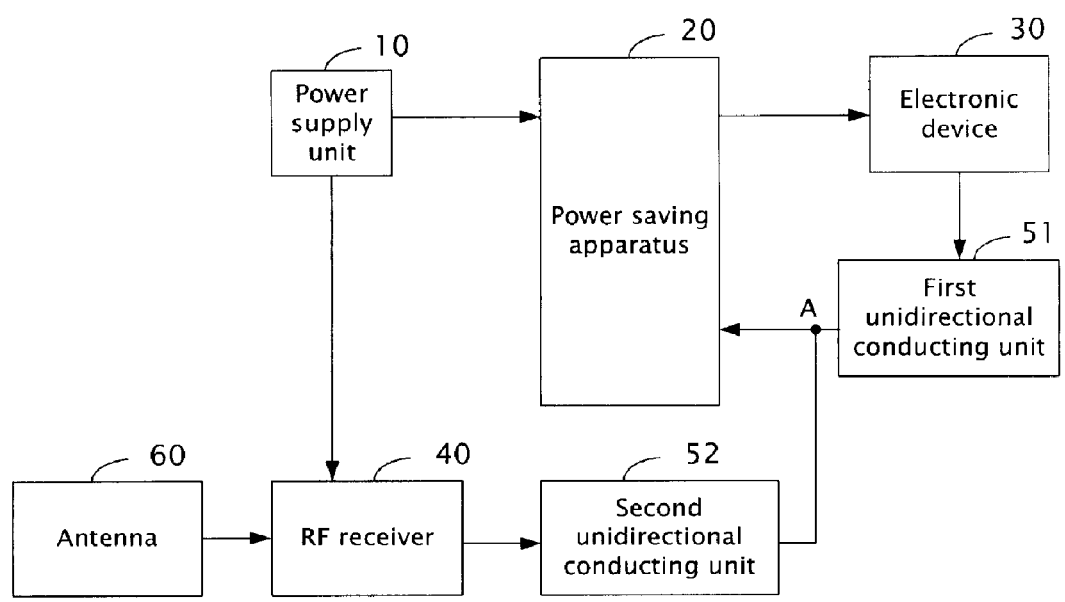
FIG. 1 depicts an exemplary circuit block of an RF-controlled power saving communication system in accordance with a preferred embodiment of the present invention.

Referring to FIG. 1, a block diagram of a radio frequency controlled (RF-controlled) power saving communication system (hereinafter simplified as "the System") is shown. The system can typically be employed in a mobile phone and mainly includes five blocks: a power supply unit 10, a power saving apparatus 20, an electronic device 30, a RF receiver 40, and an antenna 60. The power saving apparatus 20 is interposed between the power supply unit 10 and the electronic device 30, and serves as an intelligent power switch for the electronic device 30. The electronic device 30 communicates with external data, for example, communicates with a mobile phone via the antenna 60, or receives commands from a user via input tools. In general, the electronic device 30 is considered to be in a "busy" state when communicating externally; otherwise, the mobile phone 30 is considered to be in an "idle" state.

The electronic device 30 outputs real time signals informing the power saving apparatus 20 of its current state. The real time signals typically include a "normal" signal and an "idle" signal. The "normal" signal indicates that the electronic device 30 is in a "busy" state or in an "idle" state under a predetermined time period, and the "idle" signal indicates that the electronic device 30 has remained in the "idle" state over the predetermined time period. The power saving apparatus 20 discontinues the power supply to the electronic device 30 corresponding to the "idle" signal. The mobile phone 30 is then in a "power off" state, thereby avoiding power consumption thereof.

The RF receiver 40 is interposed between the power supply unit 10 and the power saving apparatus 20. The RF receiver 40 receives RF signals from an external RF source (not shown), for example from a base station of mobile communication via the antenna 60. Usually, as known to those skilled in the art, the RF signals are then transmitted to the electronic device 30 for processing. According to embodiments of the present invention, the RF signals are further transmitted to the power saving apparatus 20, and acts as an "awakening" signal of the electronic device 30. The "awakening" signal prompts the power saving apparatus 20 to resume the power supply of the electronic device 30 if the electronic device 30 is in the "power off" state. The power saving apparatus 20 thereupon activates the electronic device 30.

The "awakening" signal, as well as the "normal" signal and the "idle" signal," are inputted to the power saving apparatus 20 at a node indicated by a symbol A (hereinafter referring as to "the node A"). A first unidirectional conducting unit 51 is interposed between the electronic device 30 and the node A, and a second unidirectional conducting unit 52 is interposed between the RF receiver 40 and the node A. The first and second unidirectional conducting unit 51 and 52 co-operate and prevent communication between the electronic device 30 and the RF receiver 40 via the node A.

Figure 2:
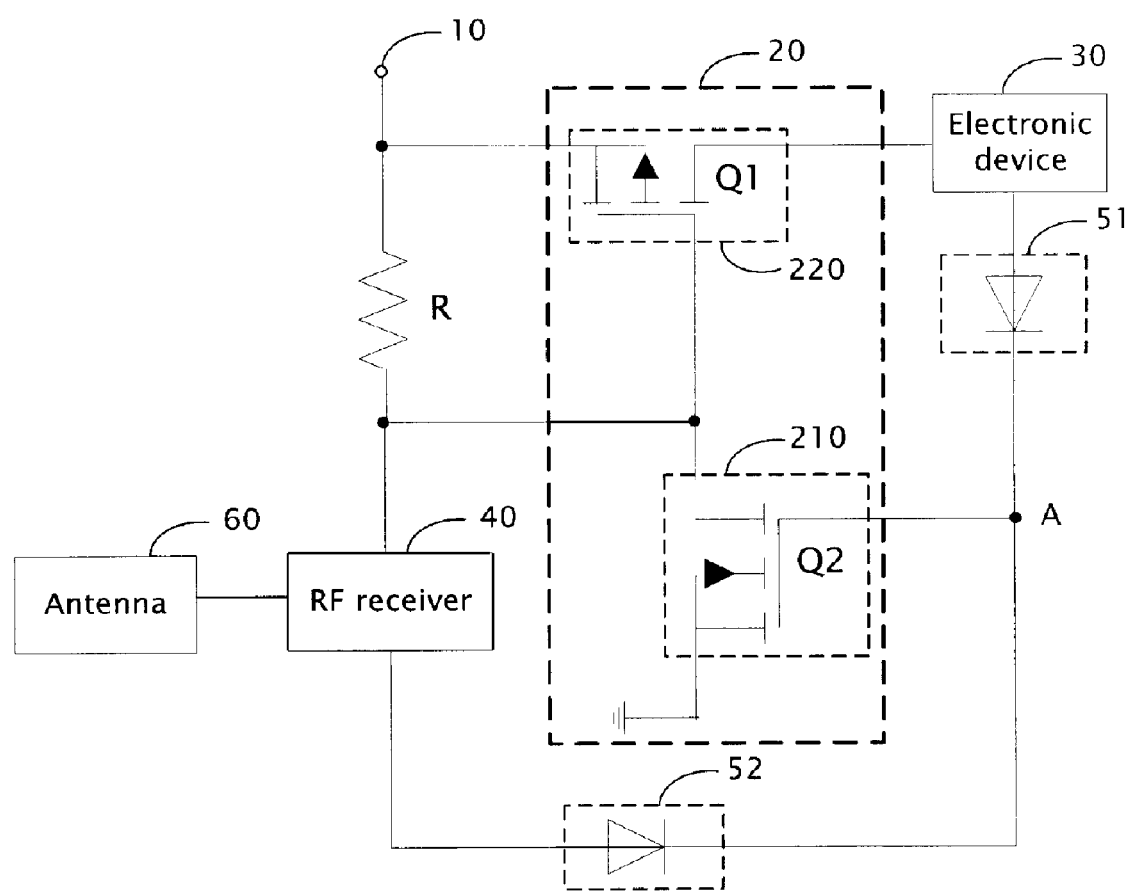
FIG. 2 depicts a circuit diagram of the RF-controlled power saving communication system in accordance with the preferred embodiment of the present invention.

Referring to FIG. 2, in one embodiment, the power saving apparatus 20 generally includes a controlling circuit 210 and a switching circuit 220, both of which are in a controllable three-terminal form. In this figure, the switching circuit is given as a P-channel Metal Oxide Semiconductor (MOS) (hereinafter, referred to simply as PMOS) Q1 as an example. The PMOS Q1 is connected with the power supply unit 10, the electronic device 30 and the controlling circuit 210 respectively at a drain, a source, and a gate thereof The controlling circuit 220 is given as a N-channel MOS (hereinafter, referred to simply as NMOS) Q2 as an example. The NMOS Q2 is connected with the switching circuit 220, the node A, and a common low-level potential (e.g., the ground potential) respectively at a source, a gate, and a drain thereof. The source of the NMOS Q2, together with the RF receiver 40, is connected to the power supply unit 10 via a resistor R. In this embodiment, the first and second unidirectional conducting unit 51 and 52 are all diodes whose cathodes are all connected with the node A and whose anodes are respectively connected with the electronic device 30 and the RF receiver 40.

NMOS Q2 receives the "normal" signal from the electronic device 30. The "normal" signal maintains the gate of NMOS Q2 at a high-level potential and NMOS Q2 accordingly turns on (closes) and allows conduction. PMOS Q1 subsequently turns on as the gate thereof is changed by the conduction of NMOS Q2 from a high-level potential to a low-level potential (i.e., equaling a value of the common low-level potential).

NMOS Q2 also receives the "idle" signal from the electronic device 30. The "idle" signal shifts the gate of the NMOS Q2 from the high-level potential to a low-level potential, and the NMOS Q2 accordingly turns off (open circuit), not allowing conduction. PMOS Q1 subsequently turns off as the gate thereof is changed by the turned-off of NMOS Q2 from the low-level potential to the high-level potential.

NMOS Q2 further receives the "awakening" signal from the RF receiver 40. The "awakening" signal resumes the high-level potential at the gate of the NMOS Q2, and NMOS Q2 accordingly turns on. PMOS Q1 subsequently turns on as the gate thereof is changed by the conduction of NMOS Q2 from the high-level potential to the low-level potential, thus to resume power supply of the electronic device 30.

Figure 3:
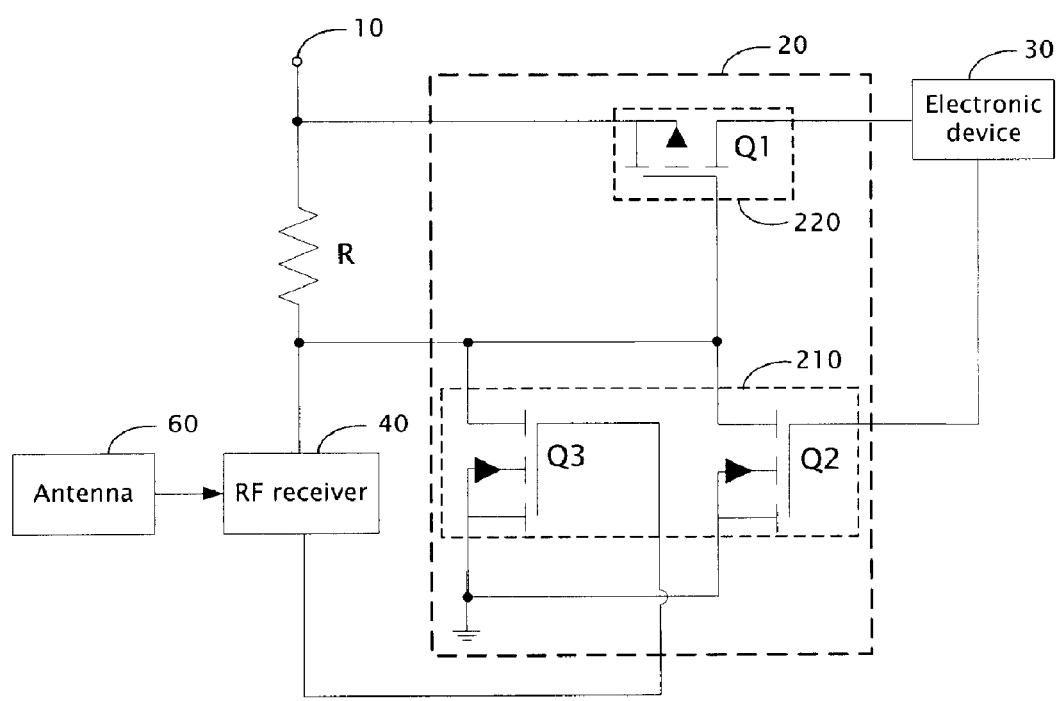
FIG. 3 depicts another circuit diagram of the RF-controlled power saving communication system in accordance with the preferred embodiment of the present invention.

Referring to FIG. 3, in this figure, the controlling circuit 210 is formed by two parallel-arranged NMOSs Q2 and Q3, both of which sources are connected with the switching circuit 220, and drains are connected with the common low-level potential. NMOS Q2 is controlled by the electronic device 30 using the "normal" signal and the "idle" signal. NMOS Q3 controlled by the RF receiver 40 using the "awakening" signal.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An RF-controlled power saving communication system, comprising:
   an electronic device;
   an antenna;
   a radio frequency (RF) receiver for receiving RF signals via the antenna and transmitting the RF signals to the electronic device to process; and
   a power saving apparatus for controlling power supply of the electronic device, the power saving apparatus comprising:
      a controlling circuit comprising two parallel-arranged N-channel MOS, a first one being controlled by the electronic device and a second one being controlled by the RF receiver using the RF signals; and
      a switching circuit configured for controlling the power supply of the electronic device under control of both the first N-channel MOS and the second N-channel MOS.

2. The system as claimed in claim 1, wherein the power saving apparatus is configured for discontinuing the power supply of the electronic device when the electronic device stays in an "idle" state over a predetermined time period.

3. The system as claimed in claim 2, wherein the power saving apparatus is further configured for maintaining the power supply of the electronic device when the electronic device stays in a "busy" state or stays in the "idle" state under the predetermined time period.

4. The system as claimed in claim 3, wherein the first N-channel MOS is turned off when the electronic device stays in an "idle" state over a predetermined time period to control the switching circuit to discontinue the power supply of the electronic device.

5. The system as claimed in claim 4, wherein the switch circuit is configured for controlling the power supply of the electronic device to resume supplying power when the second N-channel MOS receives the RF signals.

6. The system as claimed in claim 5, wherein the switching circuit comprises a P-channel MOS.

* * * * *